(12) United States Patent
Bohling et al.

(10) Patent No.: US 12,404,351 B2
(45) Date of Patent: Sep. 2, 2025

(54) PREPARATION OF AN AQUEOUS DISPERSION OF OCCLUDED POLYMER PARTICLES

(71) Applicants: Dow Global Technologies LLC, Midland, MI (US); Rohm and Haas Company, Collegeville, PA (US)

(72) Inventors: James C. Bohling, Lansdale, PA (US); Justin Gimbal, Warminster, PA (US); Ian D. Robertson, Collegeville, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 630 days.

(21) Appl. No.: 17/785,072

(22) PCT Filed: Nov. 19, 2020

(86) PCT No.: PCT/US2020/061230
§ 371 (c)(1),
(2) Date: Jun. 14, 2022

(87) PCT Pub. No.: WO2021/126454
PCT Pub. Date: Jun. 24, 2021

(65) Prior Publication Data
US 2023/0052817 A1    Feb. 16, 2023

Related U.S. Application Data

(60) Provisional application No. 62/949,471, filed on Dec. 18, 2019.

(51) Int. Cl.
| | |
|---|---|
| *C08F 2/30* | (2006.01) |
| *C08F 4/40* | (2006.01) |
| *C08F 20/12* | (2006.01) |
| *C08F 220/14* | (2006.01) |
| *C08F 220/18* | (2006.01) |
| *C08F 230/02* | (2006.01) |

(52) U.S. Cl.
CPC .................. *C08F 2/30* (2013.01); *C08F 4/40* (2013.01); *C08F 20/12* (2013.01); *C08F 220/14* (2013.01); *C08F 220/1804* (2020.02); *C08F 230/02* (2013.01)

(58) Field of Classification Search
CPC ........ C08F 2/30; C08F 220/1804; C08F 4/40; C08F 20/12; C08F 220/14; C08F 230/02
See application file for complete search history.

(56) References Cited

U.S. PATENT DOCUMENTS

| | | | |
|---|---|---|---|
| 7,176,258 B2 | 2/2007 | Buysse et al. | |
| 7,893,149 B2 | 2/2011 | Hermes et al. | |
| 7,893,151 B2 | 2/2011 | Johnson et al. | |
| 10,190,002 B2 | 1/2019 | Bohling et al. | |
| 10,865,314 B2 | 12/2020 | Namimoto et al. | |
| 2014/0221560 A1 | 8/2014 | Bohling et al. | |
| 2015/0038644 A1* | 2/2015 | Pressley ................... C08F 2/20 |
| | | | 524/809 |
| 2017/0174905 A1* | 6/2017 | Bohling ................. C09D 5/027 |
| 2020/0032078 A1 | 1/2020 | Namimoto et al. | |

FOREIGN PATENT DOCUMENTS

EP    2067820 B1    4/2011

OTHER PUBLICATIONS

Stubbs, "Core-shell and other multiphase latex particles-confirming their morphologies and relating those to synthesis variables," 2008, vol. 5, No. 2, p. 169-180.

\* cited by examiner

*Primary Examiner* — Jiangtian Xu
(74) *Attorney, Agent, or Firm* — Reid S. Willis

(57) ABSTRACT

The present invention relates to a process for preparing an aqueous dispersion of multiphase occluded polymer particles comprising the steps of a) contacting, under emulsion polymerization conditions, first monomers and a chain transfer agent to form an aqueous dispersion of first polymer particles having a $T_g$ in the range of from −30° C. to 30° C.; then b) contacting the aqueous dispersion of first polymer particles with a second monomer under emulsion polymerization conditions to form an aqueous dispersion of second polymer particles occluded within the first polymer particles, wherein the first monomers a phosphorus acid monomer or a salt thereof; and the second monomer comprises at least 90 weight percent methyl methacrylate. The aqueous dispersion of occluded polymer particles arising from the process of the present invention is useful in a formulation that can be used to prepare a water-resistant blister free LASD coating.

6 Claims, No Drawings

PREPARATION OF AN AQUEOUS DISPERSION OF OCCLUDED POLYMER PARTICLES

BACKGROUND OF THE INVENTION

Damping materials are used to mitigate vibration in rigid structures to reduce noise. In motor vehicles, two major vibration damping technologies dominate: bitumen pads and liquid applied sound damping (LASD) coatings derived from waterborne latexes. Bitumen pads, a low-cost alternative widely used in the 20th century, exhibit relatively poor damping performance and require laborious manual application. LASD coatings, on the other hand, have gained significant market share because they may be rapidly applied by robotic spray techniques. Moreover, LASD coatings exhibit better damping properties, environmental, health, and safety (EH&S) profiles, and lower densities. Together, these benefits have led automotive OEMs to increasingly employ LASD for noise vibration and harshness (NVH) management over the incumbent bitumen pads. WO 2018/062546 A1 describes aqueous dispersions of polymer particles suitable for vibration damping applications. Although improved suppression of blistering is reported, water resistance is not described. There is still a need in the art to develop LASD coatings with excellent water resistance compared to bitumen pads. Water-resistant LASD coatings would likely facilitate adoption of this technology with customers. Additionally, improved water resistance could allow LASD coatings to be used in new application areas, such as inside the wheel wells of a vehicle. It would therefore be an advance in the art to develop an aqueous dispersion of polymer particles that may be formulated into an LASD coating that is water resistant, exhibits an excellent appearance, and maintains high vibration damping performance.

SUMMARY OF THE INVENTION

The present invention is a process for preparing an aqueous dispersion of multiphase occluded polymer particles comprising the steps of a) contacting, under emulsion polymerization conditions, first monomers and a chain transfer agent to form an aqueous dispersion of first polymer particles having a $T_g$ in the range of from −30° C. to 30° C., wherein the concentration of the chain transfer agent is from 0.5 to 1.5 mole percent based upon the moles of first monomers and the chain transfer agent; then b) contacting the aqueous dispersion of first polymer particles with a second monomer under emulsion polymerization conditions to form an aqueous dispersion of second polymer particles occluded within the first polymer particles, wherein the first monomers comprise from 0.2 to 5 weight percent of a phosphorus acid monomer or a salt thereof, based on the weight of the first monomers; the second monomer comprises at least 90 weight percent methyl methacrylate; and wherein the weight to weight ratio of first monomers to the second monomer is in the range of from greater than 80:20 and less than 95:5.

The present invention addresses a need in the art by providing an aqueous composition that forms a water-resistant blister free coating that is useful in sound dampening applications.

DETAILED DESCRIPTION OF THE INVENTION

The present invention is a process for preparing an aqueous dispersion of multiphase occluded polymer particles comprising the steps of a) contacting, under emulsion polymerization conditions, first monomers and a chain transfer agent to form an aqueous dispersion of first polymer particles having a $T_g$ in the range of from −30° C. to 30° C., wherein the concentration of the chain transfer agent is from 0.5 to 1.5 mole percent based upon the moles of first monomers and the chain transfer agent; then b) contacting the aqueous dispersion of first polymer particles with a second monomer under emulsion polymerization conditions to form an aqueous dispersion of second polymer particles occluded within the first polymer particles, wherein the first monomers comprise from 0.2 to 5 weight percent of a phosphorus acid monomer or a salt thereof, based on the weight of the first monomers; the second monomer comprises at least 90 weight percent methyl methacrylate; and wherein the weight to weight ratio of first monomers to the second monomer is in the range of from greater than 80:20 and less than 95:5.

The first polymer particles are advantageously prepared by contacting under emulsion polymerization conditions first monomers and a chain transfer agent to form an aqueous dispersion of first polymer particles having a $T_g$, as calculated by the Fox equation, in the range of −30° C., preferably from −20° C., to 30° C., preferably to 20° C., more preferably to 10° C., wherein the concentration of the chain transfer agent is from 0.5, preferably from 0.7, more preferably from 1 mole percent, to 1.5, preferably to 1.3, and more preferably to 1.2 mole percent based upon the moles of first monomers and the chain transfer agent.

The chain transfer agent is any compound that is capable of regulating the molecular weight of the polymer during the polymerization process. Especially suitable chain transfer agents include alkyl mercaptans such as n-dodecyl mercaptan (n-DDM) and t-dodecyl mercaptan (t-DDM).

As used herein, "first monomers" refers to monomers selected to form first polymer particles having a $T_g$ in the range of from −30° C. to 30° C. Preferred first monomers comprise a) methyl methacrylate (MMA) or styrene; and b) one or more monomers selected from the group consisting of butyl acrylate (BA), ethyl acrylate, 2-ethylhexyl acrylate, and 2-propylheptyl acrylate, with the combination of MMA and BA being preferred. The first monomers also comprise from 0.2, more preferably from 0.5, more preferably from 0.8, and most preferably from 1.0 weight percent to 5, more preferably to 3, and most preferably to 2 weight percent structural units of a phosphorus acid monomer or a salt thereof, based on the weight of the first polymer particles. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

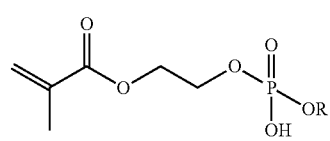

where R is H or

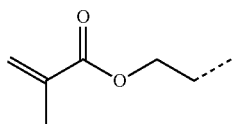

wherein the dotted line represents the point of attachment to the oxygen atom.

The second polymer particles are advantageously prepared in a second step, after substantial or complete polymerization of the first monomers, by contacting the aqueous dispersion of first polymer particles with the second monomer under emulsion polymerization conditions; the second monomer preferably comprises at least 92, more preferably at least 95, more preferably at least 98, and more preferably at least 99 weight percent methyl methacrylate.

The second monomer may comprise up to 8 weight percent of another monomer such as methacrylic acid (MAA).

The first and second monomers form structural units upon polymerization. As used herein, "structural unit" of the named monomer refers to the remnant of the monomer after polymerization. For example, a structural unit of MMA is as illustrated:

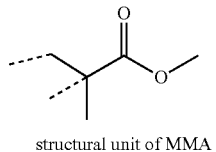

structural unit of MMA where the dotted lines represent the points of attachment of the structural unit to the polymer backbone.

The consequent high $T_g$ second polymer particles form discrete high $T_g$ (hard) domains within the low $T_g$ (soft) domain first polymer particles, as opposed to forming a distinct outer layer superposing the low $T_g$ polymer particles as disclosed in WO 2018/062546 A1. The discrete domains are said to be occluded (incorporated into) the first polymer particles. Occlusion was confirmed by atomic force microscopy. A discussion and description of the morphology of occluded multiphase latex particles can be found in J. Coat. Technol. Res., 5 (2) 169-180, 2008. The weight-to-weight ratio of occluded second polymer particles to first polymer particles is preferably in the range of from 6:94, more preferably from 8:92, to 19:81, more preferably to 17:83.

The occluded polymer particles preferably have a z-average particle size by dynamic light scattering in the range of from 80 nm, and more preferably 100 nm, to 400 nm, more preferably 300 nm, and most preferably to 200 nm. The polymer particles preferably have a $M_n$ (measured by gel permeation chromatography described hereinbelow) in the range of from 10,000, more preferably from 11,000 g/mole, to preferably 22,000, more preferably to 18,000, more preferably to 15,000, to most preferably 13,000 g/mole.

The solids content of the aqueous dispersion of occluded multiphase polymer particles is preferably in the range of from 20 to 60 weight percent. Preferably, the multiphase polymer particles are 2-phase polymer particles.

The aqueous dispersion of occluded polymer particles is advantageously used as part of a formulation suitable for LASD applications. The formulation comprises at least one additive selected from the group consisting of extenders, baking additives such as starches, and rheology modifiers. Preferably, the formulation comprises all of these additives.

The formulation further preferably comprises a nonionic compound of Structure I:

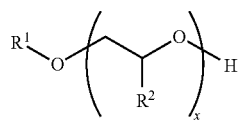

where $R^1$ is H or $C_6$-$C_{18}$-alkyl; $R^2$ is H or $CH_3$; and x is from 30, preferably from 45, and more preferably from 80; to 300, preferably to 250, and more preferably to 200.

Preferred nonionic compounds are polyethylene glycols (where $R^1$ is H) or polyethylene oxide secondary alcohol ethoxylates (where $R^1$ is a branched alkyl group). Commercially available suitable nonionic compounds include CARBOWAX™ PEG 4000 and 8000 Polyethylene Glycols (PEG 4000 and PEG 8000, respectively), and TERGITOL™ 15-S-20 and 15-S-40 Secondary Alcohol Ethoxylates (Trademarks of The Dow Chemical Company or Its Affiliates).

The concentration of the nonionic compound of Structure I in the formulation is in the range of from 0.2, more preferably from 0.5 weight percent, to 5, more preferably to 3, and most preferably to 2 weight percent, based on the weight of the formulation.

It has been found that phosphorus acid functionalization, preferably PEM functionalization, of the soft domain of the occluded polymer particles has a particularly beneficial effect on texture, blistering, and water-uptake profiles of formulations comprising these occluded polymer particles over the prescribed narrow $M_n$ range; moreover, the inclusion of the nonionic compound of Structure I in the formulation along with the phosphorus acid functionalized occluded polymer particles has been found to improve these critical properties.

It has been surprisingly discovered that coatings suitable for vibration damping applications can be prepared with desirable texture very low water uptake, as well little or no evidence of blistering.

Gel Permeation Chromatographic Method of Measuring $M_n$ of Occluded Particles

GPC samples were prepared in THF at a concentration of 5 mg/mL based on the occluded polymer solids content. The sample solutions were kept on a flatbed shaker at room temperature overnight, then filtered through a 0.45 μm PTFE filter (Whatman) prior to GPC analysis. The GPC instrument setup consisted of an Agilent 1200 series HPLC system (degasser, pump, autosampler), and a Wyatt T-rEX refractive index detector. The polymer separation was carried out on a column set that consisted of one TOSOH TSKgel $GMH_{x1}$-L and one TOSOH TSKgel $G5000H_{x1}$ column (each packed with 9 μm styrene divinylbenzene gels; each dimension 7.5 mm ID×30 cm) using THF as the mobile phase at a flow rate of 1 mL/min; the injection volume was 40 μL.

Astra 7 software (Wyatt Technology) was used for data acquisition and processing. $M_n$ and $M_w$ were calculated using a conventional calibration method based on polystyrene standards (Agilent Technology) as shown in Table 1 below:

TABLE 1

| | Polystyrene Standard | |
|---|---|---|
| Peak | PS mixA1 (g/mol) | PSmixB1 (g/mol) |
| 1 | 6,035,000 | 2,698,000 |
| 2 | 597,500 | 290,300 |
| 3 | 126,000 | 69,650 |
| 4 | 30,230 | 9,960 |
| 5 | 2,970 | 580 |

The number- and weight-average molecular weight were obtained based on the polystyrene calibration curve and sample elution profile by equations:

$$M_n = \frac{\sum_{i=1}^{N} h_i}{\sum_{i=1}^{N}(h_i/M_i)}$$

$$M_w = \frac{\sum_{i=1}^{N}(h_i M_i)}{\sum_{i=1}^{N} h_i}$$

Where $h_i$ is the GPC curve height at the ith volume increment and the $M_i$ is the molecular weight of the species eluted at the ith retention volume based on polystyrene calibration curve.

EXAMPLES

Example 1—Preparation of an Aqueous Dispersion of 2-Stage Occluded Polymer Particles with 10% Hard Stage A first monomer emulsion was prepared by mixing deionized water (492 g), sodium lauryl ether sulfate (43 g, 31% active in water), BA (1066 g, 8.32 moles), MMA (797 g, 7.96 moles), PEM (43 g, 60% active, 0.12 mole), and n-DDM (37 g, 0.18 mole). A second monomer emulsion was prepared by mixing deionized water (134 g), sodium lauryl ether sulfate (5 g, 30% active in water) and MMA (214 g, 2.14 moles).

Deionized water (881 g) and sodium lauryl ether sulfate (2.4 g, 31% active) were added to a 5-L, four-necked round bottom flask equipped with a paddle stirrer, a thermometer, a nitrogen inlet, and a reflux condenser. The contents of the flask were heated to 84° C. under nitrogen and stirring was initiated. A portion of the first monomer emulsion (132 g) was then added quickly, followed by addition of a solution of ammonium persulfate (5 g) in deionized water (55 g). After stirring for 10 min, the remainder of the first monomer emulsion, and an initiator solution of ammonium persulfate (2.1 g) in deionized water (90 g) were added separately over 80 min. The contents of the flask were held at 84° C. for 10 min, after which time the second monomer emulsion and an initiator solution containing sodium persulfate (0.2 g) in deionized water (10 g) were added separately to the flask over a period of 10 min.

The batch was then cooled and residual monomer reduced with a redox pair then neutralized to a pH of 9. The z-average particle size was measured by a Brookhaven BI-90 Plus Particle Size Analyzer to be 165 nm, and the percent solids was found to be 51%. The gel permeation chromatographic calculated $M_n$ was found to be 12,000 g/mole.

Example 2—Preparation of an Aqueous Dispersion of 2-Stage Occluded Polymer Particles with 15% Hard Stage The process described in Example 1 was followed except that the relative amounts of monomer emulsion 1 and monomer emulsion 2 were adjusted to a weight-to-weight ratio of 85:15. The z-average particle size was measured to be 160 nm and the percent solids was found to be 51%. The gel permeation chromatographic calculated $M_n$ was found to be 12,000 g/mole.

Example 3—Preparation of an Aqueous Dispersion of 2-Stage Occluded Polymer Particles with an MMA/MAA 10% Hard Stage The process described in Example 1 was followed except that 1.5 weight percent of the MMA (3.2 g) was replaced with an equal amount (3.2 g) of MAA in the second monomer emulsion. The z-average particle size was measured to be 163 nm and the percent solids was found to be 52%. The gel permeation chromatographic calculated $M_n$ was found to be 12,000 g/mole.

Example 4—Preparation of an Aqueous Dispersion of 2-Stage Occluded Polymer Particles with Lower Chain Transfer Agent Concentration The process described in Example 1 was repeated except that the amount of n-DDM in the first monomer emulsion was reduced from 37 g to 18.5 g (0.09 mole). The particle size was measured to be 168 nm and the percent solids was found to be 51%. The gel permeation chromatographic calculated $M_n$ was found to be 20,000 g/mole.

Example 5—Preparation of an Aqueous Dispersion of 2-Stage Occluded Polymer Particles with Lower Chain Transfer Agent Concentration The process described in Example 1 was repeated except that the amount of n-DDM in the first monomer emulsion was reduced from 37 g to 29 g (0.14 mole). The z-average particle size was measured to be 175 nm and the percent solids was found to be 51%. The gel permeation chromatographic calculated $M_n$ was found to be 15,000 g/mole.

Example 6—Preparation of an Aqueous Dispersion of 2-Stage Occluded Polymer Particles with Higher Chain Transfer Agent Concentration The process described in Example 1 was repeated except that the amount of n-DDM in the first monomer emulsion was increased from 37 g to 48 g (0.24 mole). The z-average particle size was measured to be 192 nm and the percent solids was found to be 51%. The gel permeation chromatographic calculated $M_n$ was found to be 10,000 g/mole.

Example 7—Preparation of a 2-Stage Occluded Polymer with MMA and BA in Hard Domain The process as described in Example 1 was followed except that the monomer composition of the second monomer emulsion was BA (10.7 g) and MMA (203.3 g) instead of all MMA. The z-average particle size was found to be 170 nm and the percent solids was found to be 51%. The gel permeation chromatographic calculated $M_n$ was found to be 12,000 g/mole.

Comparative Example 1—Preparation of an Aqueous Dispersion of 2-Stage Occluded Polymer Particles with Lower Chain Transfer Agent Concentration The process described in Example 1 was repeated except that the amount of n-DDM in the first monomer emulsion was decreased from 37 g to 9.6 g (0.05 mole). The z-average particle size was measured to be 167 nm and the percent solids was found to be 51%. The gel permeation chromatographic calculated $M_n$ was found to be 34,000 g/mole.

Comparative Example 2—Preparation of an Aqueous Dispersion of 2-Stage Occluded Polymer Particles with Higher Chain Transfer Agent Concentration The process described in Example 1 was repeated except that the amount of n-DDM in the first monomer emulsion was increased from 37 g to 57 g (0.28 mole). The z-average particle size was measured to be 164 nm and the percent solids was found to be 52%. The gel permeation chromatographic calculated $M_n$ was found to be 8600 g/mole.

Comparative Example 3—Preparation of an Aqueous Dispersion of 2-Stage Occluded Polymer Particles with 10% Hard Domain of MMA and Isobornyl Methacrylate The process as described in Example 1 was repeated except that isobornyl methacrylate (106 g) replaced an equal amount of MMA (106 g) in the second monomer emulsion. The z-average particle size was measured to be 164 nm and the percent solids was found to be 51%. The gel permeation chromatographic calculated $M_n$ was found to be 12,000 g/mole.

Comparative Example 4—Preparation of an Aqueous Dispersion of 2-Stage Occluded Polymer Particles with 10% Hard Domain of Styrene The process as described in Example 1 was repeated except that styrene (214 g) was used in the second monomer emulsion instead of MMA, and the feed time of the second monomer emulsion was added to the reactor over 30 min. The z-average particle size was measured to be 163 nm and the percent solids was found to be 51%. The gel permeation chromatographic calculated $M_n$ was found to be 13,000 g/mole.

Preparation of Coating Formulations

Coating formulations were prepared from the components listed in Table 2 in the order listed. The components were mixed with an overhead stirrer for 10 min, then allowed to equilibrate overnight. Emulsion polymer refers to the aqueous dispersions of occluded polymer particles of Examples 1-7 and Comparative Examples 1-5.

TABLE 2

Coating Formulation

| Component | Mass (g) |
|---|---|
| Emulsion Polymer | 39.2 |
| Bayferrox Black 318 Pigment | 0.2 |
| Durcal 10 CaCO₃ | 57.9 |
| Kollotex 1500 potato starch | 2.5 |
| ACRYSOL ™ RM-12W Rheology Modifier | 1.0 |
| CARBOWAX ™ PEG 8000 Polyethylene Glycol[a] | 1.0 |

[a]Only Formulations 4-7, and Comparative Formulations 1 and 2 include PEG 8000 (see Table 2).

Water Uptake Testing

Coatings were drawn down into 4×100×80-mm samples on aluminum panels. The samples were then left at room temperature for 30 min and subsequently baked at 150° C. for 30 min. Samples were cooled to room temperature and weighed to determine their total mass. Samples were then immersed in 10 cm of water for 48 h and weighed again. The water uptake was reported as the percentage mass difference between soaked and unsoaked samples.

Blistering

Blistering was evaluated on scale of 1-10 as defined below:
10: Trace or no surface defects
8: Slight bumps
6: Moderate bumps
4: Heavy bumps
2: Severe bumps Texture Texture was evaluated on a scale of 1-10 as defined below:
10: Trace or no surface defects
8: Slight craters, pinholes
6: Moderate craters, pinholes
4: Heavy craters, pinholes
2: Severe craters, pinholes Table 3 summarizes the water uptake, blistering, and texture results for coatings prepared from the formulations.

TABLE 3

Water Uptake, Blistering, and Texture of Coatings

| Formulation # | Example # | Texture | Blistering | Water Uptake - 48 h (%) |
|---|---|---|---|---|
| 1 | Ex. 1 | 10 | 10 | 5.2 |
| 2 | Ex. 2 | 9 | 10 | 4.8 |
| 3 | Ex. 3 | 9 | 10 | 3.7 |
| 4 | Ex. 4 | 10 | 10 | 7.9 |
| 5 | Ex. 5 | 10 | 10 | 4.6 |
| 6 | Ex. 6 | 8 | 10 | 3.4 |
| 7 | Ex. 1 | 10 | 10 | 3.0 |
| 8 | Ex. 7 | 10 | 9 | 4.9 |
| Comp. 1 | Comp. Ex. 1 | 9 | 3 | 11.0 |
| Comp. 2 | Comp. Ex. 2 | 6 | 6 | 3.4 |
| Comp. 3 | Comp. Ex. 3 | 3 | 6 | 2.3 |
| Comp. 4 | Comp. Ex. 4 | 5 | 6 | 2.7 |

The coatings formed from the compositions of Examples 1-7 all show excellent appearance without major defects as demonstrated by numerical ratings for texture and blistering of at least 8. Moreover, each of the coatings from Examples 1-7 have an acceptable water uptake of less than 10%. In contrast, the compositions of the comparative examples all fail in at least one aspect of appearance. The results show the criticality of $M_n$ as well as the high weight fraction of structural units of MMA in the occluded second polymer.

The invention claimed is:

1. A process for preparing an aqueous dispersion of multiphase occluded polymer particles comprising the steps of a) contacting, under emulsion polymerization conditions, first monomers and a chain transfer agent to form an aqueous dispersion of first polymer particles having a $T_g$ in the range of from −30° C. to 30° C., wherein the concentration of the chain transfer agent is from 0.5 to 1.5 mole percent based upon the moles of first monomers and the chain transfer agent; then b) contacting the aqueous dispersion of first polymer particles with a second monomer under emulsion polymerization conditions to form an aqueous dispersion of second polymer particles occluded within the first polymer particles, wherein the first monomers comprise from 0.2 to 5 weight percent of a phosphorus acid monomer or a salt thereof, based on the weight of the first monomers; the second monomer comprises at least 90 weight percent methyl methacrylate; and wherein the weight to weight ratio of first monomers to the second monomer is in the range of from greater than 80:20 and less than 95:5.

2. The process of claim 1 wherein the first monomers comprise a) methyl methacrylate or styrene; and b) one or more monomers selected from the group consisting of butyl acrylate, ethyl acrylate, 2-ethylhexyl acrylate, and 2-propylheptyl acrylate.

3. The process of claim 2 wherein the phosphorus acid monomer is phosphoethyl methacrylate at a concentration of from 0.5 to 3 weight percent, based on the weight of the first monomers.

4. The process of claim 3 wherein the second monomer comprises at least 95 weight percent methyl methacrylate, and the weight to weight ratio of second monomer to the first monomers is in the range of from 8:92 to 17:83.

5. The process of claim 4 wherein the concentration of the chain transfer agent is in the range of from 0.7 to 1.3 mole percent, based upon the moles of first monomers and the chain transfer agent.

6. The process of claim 5 wherein the first monomers comprise methyl methacrylate, butyl acrylate, and phosphoethyl methacrylate; and wherein the second monomers comprise at least 98 weight percent methyl methacrylate.

* * * * *